United States Patent [19]

Miyasaka

[11] Patent Number: 4,693,584

[45] Date of Patent: Sep. 15, 1987

[54] DIAPHRAGM CONTROLLER FOR CAMERAS IN WHICH THE DIAPHRAGM OPENING IS SELECTED IN ACCORDANCE WITH A PREPROGRAMMED CHARACTERISTIC

[75] Inventor: Tetsuo Miyasaka, Hachioji, Japan

[73] Assignee: Olymputs Optical Co., Ltd, Tokyo, Japan

[21] Appl. No.: 877,092

[22] Filed: Jun. 19, 1986

Related U.S. Application Data

[63] Continuation of Ser. No. 588,348, Mar. 12, 1984, abandoned.

[30] Foreign Application Priority Data

May 12, 1983 [JP] Japan ................................. 58-83682

[51] Int. Cl.⁴ .............................................. G03B 7/08
[52] U.S. Cl. .................... 354/446; 354/443; 354/455; 354/286
[58] Field of Search ............... 354/441, 442, 444, 446, 354/448, 455, 286

[56] References Cited

U.S. PATENT DOCUMENTS 4,196,997  4/1980  Ohmori et al. ...................... 354/286
4,264,159  4/1981  Ueda et al. .......................... 354/442
4,307,948  12/1981  Kitamura et al. .................... 354/448
4,381,889  5/1983  Sahara et al. ....................... 354/448

FOREIGN PATENT DOCUMENTS 0127528  10/1980  Japan .
0144531   9/1982  Japan .

Primary Examiner—Russell E. Adams
Attorney, Agent, or Firm—Louis Weinstein

[57] ABSTRACT

A diaphragm controller for a camera of the program type which determines a reduced aperture in accordance with the brightness of an object being photographed and effects a diaphragm control based on an exposure period corresponding to the reduced aperture by measuring the amount of object light passing through the reduced aperture, compares a photometric output of light passing through an aperture during the aperture reducing operation and an output which is obtained by calculating an output which varies during the aperture reducing operation so as to satisfy a predetermined program characteristic and controls an aperture value based on the program characteristic when the photometric output and the calculated output coincide.

14 Claims, 16 Drawing Figures ial values. Also, when a programmed characteristic is expressed by the basic programmed characteristic line $P_0$, the following relation is established.

DIAPHRAGM CONTROLLER FOR CAMERAS IN WHICH THE DIAPHRAGM OPENING IS SELECTED IN ACCORDANCE WITH A PREPROGRAMMED CHARACTERISTIC

This is a continuation of application Ser. No. 588,348, filed Mar. 12, 1984 now abandoned.

BACKGROUND OF THE INVENTION

The present invention relates to a diaphragm controller for a camera of the program type, and more particularly, to such a diaphragm controller for a camera of the program type which controls a diaphragm aperture so as to be determined by a predetermined program characteristic in response to the brightness of an object being photographed.

In a single-lens reflex camera of the program type which hitherto controls a diaphragm aperture based on a predetermined program characteristic, an open F value of a taking lens should be first introduced as an exposure information. Then the brightness value of an object being photographed is calculated based on the open F value introduced and a TTL (through the lens) photometric value at the open aperture of the taking lens. Thereby, a diaphragm aperture and an exposure period are determined from the calculated brightness value based on the predetermined program characteristic. Specifically, in a diaphragm control, a TTL photometry is conducted once at open aperture and the TTL photometric value is stored. Then, the diaphragm aperture is reduced and a TTL photometric value of light passing through a reduced aperture during the aperture reducing operation is compared with a predetermined value which is calculated based on the stored photometric value at open aperture. When both values coincide, a magnet for suspending the aperture reducing operation or the like is driven to suspend it. Accordingly, a conventional camera of the program type is generally provided with a transmitting member for transmitting an open F value of a taking lens to the camera. With a camera not provided with such a member, it is possible to conduct a diaphragm control based on a predetermined program characteristic.

SUMMARY OF THE INVENTION

In view of the foregoing, it is an object of the invention to provide a diaphragm controller for a camera of the program type which compares a photometric output of light passing through a reduced aperture during the aperture reducing operation and an output which is obtained by applying a calculation to the photometric output which varies during the aperture reducing operation so as to satisfy a predetermined program characteristic and controls a diaphragm aperture based on the predetermined program characteristic when the photometric output and the calculated output coincide.

According to the invention, it is possible to achieve a diaphragm control based on a predetermined program characteristic even with a camera which is provided with no transmitting member for introducing an open F value.

DETAILED DESCRIPTION OF PREFERRED EMBODIMENTS

In advance of the description of embodiments of the invention, the theory thereof will be described with equations.

Figure 1:
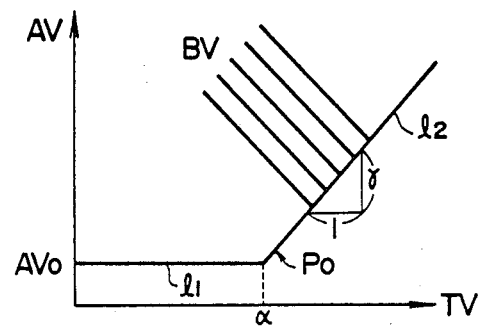
FIG. 1 is a diagram of a basic programmed characteristic which is determined by a program constant in a diaphragm controller for a camera of the program type according to the invention.

In defining a programmed characteristic for a diaphragm controller of the invention; a basic programmed characteristic line $P_0$ is assumed, as shown in FIG. 1, in a system of rectangular coordinates TV-AV where the abscissa represents exposure periods TV and the ordinate represents apertures AV. The programmed characteristic line $P_0$ includes a straight line $l_1$ expressed by $AV = AV_0$ and another straight line $l_2$ which has an inclination $\gamma$ passing through a point $(\alpha, AV_0)$. The line $l_2$ having the inclination $\gamma$ is expressed as follows:

$$AV - AV_0 = \gamma(TV - \alpha) \qquad (1)$$

In the equation, $TV = \alpha$ indicates a limit level for open aperture and $AV = AV_0$ indicates an aperture value at the limit level, that is, an open aperture value (for example, $AV_0 = 1$ in the APEX value) in the basic programmed characteristic which is defined on design. Here, the limit level $\alpha$ may be defined as a limit time for movement of the hands in taking a picture, for example. The symbol $\gamma$ indicates how many steps an aperture value AV varies when an exposure period value TV varies by one step.

Now, when exposure information on an aperture value AV, a brightness value BV of an object being photographed, a sensitivity value of film SV and an exposure period value Tv are expressed in APEX values, the following equation holds from the relation among these information.

$$AV = BV + SV - TV \quad (2)$$

From the equations (1) (2), it is seen that $$BV + SV - TV - AV_0 = \gamma(TV - \alpha) \quad (3)$$

From the equation (3), the following equation will be obtained.

$$(1 + \gamma) TV = BV + SV - AV_0 + \alpha\gamma \quad (4)$$

$$\therefore TV = \frac{1}{1 + \gamma}(BV + SV - AV_0 + \alpha\gamma)$$

Specifically, the equation (4) is a basic formula of the programmed characteristic line $P_0$ and an exposure period value TV is determined when the brightness of an object BV and a film sensitivity SV are known.

Substituting the equation (4) in the equation (2), the following is obtained.

$$AV = \frac{\gamma}{\gamma + 1}(BV + SV - \alpha - AV_0) + AV_0 \quad (5)$$

Accordingly, from the equation (5), the aperture value AV can be determined when the values BV and SV are known.

Assuming that the number of steps in an aperture value which is reduced from the open aperture when the aperture value AV is determined is ΔAV, it follows that $$\Delta AV = AV - AV_0 \quad (6)$$

The following equation will be obtained substituting the equation (5) in the equation (6).

$$\Delta AV = \frac{\gamma}{1 + \gamma}(BV + SV - \alpha - AV_0) \quad (7)$$

It is clear from the equation (7) that the value ΔAV can be obtained when the values BV and SV are known.

When the aperture reducing operation is initiated to decrease an aperture toward the minimum value and the number of steps in an aperture value which is reduced from the open aperture during the aperture reducing operation is $\Delta AV_{act}$, the light amount BV' at the reduced aperture is $$BV' = BV - AV_0 - \Delta AV_{act} \quad (8)$$

When a film sensitivity SV is added to the equation (8), it follows that $$BV' + SV = BV + SV - AV_0 - \Delta AV_{act} \quad (9)$$

Here, the following signal is intentionally created.

$$\alpha + (1/\gamma)\Delta V_{act} \quad (10)$$

When this signal and the value of the equation (9) are equated for the purpose of comparison, $$BV + SV - AV_0 - \Delta AV_{act} = \alpha + (1/\gamma)\Delta AV_{act} \quad (11)$$

From the equations (11) and (7), the following expression will be obtained.

$$\Delta AV_{act} = \frac{\gamma}{1 + \gamma}(BV + SV - \alpha - AV_0) = \Delta AV \quad (12)$$

Specifically, when both signals expressed by the equations (9) and (10) reach the condition where the equation (11) is satisfied, the number of steps value during the aperture reducing operation $\Delta AV_{act}$ is equal to the value ΔAV which satisfies the equation (7). Accordingly, even if the object brightness value BV is not known but if the light amount value BV' during the aperture reducing operation and a film sensitivity value SV are known, both signals of BV'+SV and $\alpha+(1/\gamma)\Delta AV_{act}$ are compared and the aperture reducing operation is terminated when both signals coincide so that a diaphragm control based on the above mentioned programmed characteristic line $P_0$ can be achieved.

An embodiment of the invention will be explained based on the above mentioned theory thereof.

Figure 2:
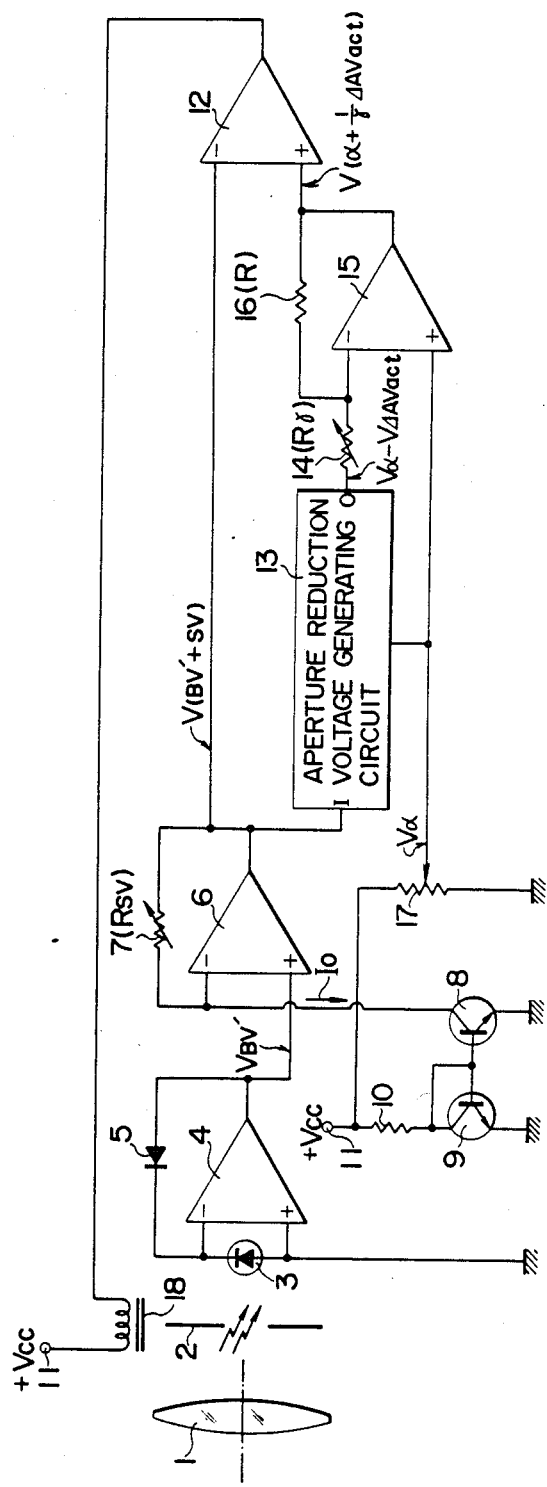
FIG. 2 is a circuit diagram of a diaphragm controller illustrating an embodiment of the invention.

In FIG. 2, a photoelectric transducer element 3 such as an SBC (Silicon Blue Cell) which is a disposed at a place in a camera where light from an object being photographed passing through a taking lens 1 and diaphragm 2 can be received, is connected between an inverting and a non-inverting input terminal of an operation amplifier 4 for use in a photometric circuit with its anode toward the non-inverting input terminal. A logarithmic compression diode 5 is connected between the inverting input terminal and the output terminal of the amplifier 4 with its anode toward the output terminal of the amplifier 4. The non-inverting input terminal of the amplifier 4 is grounded and its output terminal is connected to a non-inverting input terminal of an operational amplifier 6 for introducing film sensitivity information in the next stage. An inverting input terminal of the amplifier 6 is connected through a variable resistor 7 for setting a film sensitivity value to an output terminal of the amplifier 6 and to the collector of an NPN type transistor 8. The base of the transistor 8 is connected to the base and the collector of an NPN type transistor 9 and the collector of the latter is connected through a resistor 10 to a terminal 11 to which a power voltage +Vcc is applied. The emitters of the transistors 8, 9 are grounded. As both transistors 8, 9 are of the same characteristic, a circuit including them forms a well known current mirror circuit so that a constant current $I_0$ which is equal to a collector current flowing through the transistor 9 flows through the collector of the transistor 8 to the variable resistor 7.

The output terminal of the amplifier 6 is connected to an inverting input terminal of a comparator 12 on the one hand and to an input terminal I of an aperture reduction voltage generating circuit 13 on the other hand. An output terminal O of the circuit 13 is connected to a variable resistor 14 for adjusting an inclination to determine the inclination value γ to an inverting input terminal of an operational amplifier 15 for calculating a program constant. A resistor 16 is connected between the inverting input terminal and the output terminal of the amplifier 15 and the output terminal thereof is connected to a non-inverting input terminal of the comparator 12. In addition, a sliding terminal of a variable resistor 17 for setting a reference voltage which is connected between the power supply terminal 11 and the ground, is connected to the non-inverting input terminal of the amplifier 15 and the aperture reduction voltage generating circuit 13. The variable resistor 17 is employed to define the limit level $\alpha$ at open aperture and a reference voltage $V_\alpha$ proportional to the limit level $\alpha$ is fed to the circuit 13 and the amplifier 15. An output terminal of the comparator 12 is connected through a magnet coil 18 for the diaphragm control to the power supply terminal 11.

In operation, when light from an object being photographed passing through the lens 1 and the diaphragm 2 impinges upon the transducer element 3, a voltage $V_{BV'}$ which is logarithmically compressed the amount of the received light is produced at the output terminal of the amplifier 4. The voltage $V_{BV'}$ is in proportion to the value BV' shown in the equation (8). When the voltage $V_{BV'}$ is fed into the non-inverting input terminal of the amplifier 6, a voltage $V_{SV} = R_{SV} \cdot I_0$ is added thereto, where $I_0$ is a constant current flowing through the variable resistor 7 and $R_{SV}$ is the resistance of the latter. Thus, a voltage $V_{(BV'+SV)}$ corresponding to the BV'+SV is produced at the output terminal of the amplifier 6. The output of the amplifier 6 is fed to the inverting input terminal of the comparator 12 as well as the aperture reduction voltage generating circuit 13. The circuit 13, into which the reference voltage $V_\alpha$ is fed, creates a voltage $V_{\Delta AVact}$ proportional to the number of steps $\Delta AV_{act}$ in an aperture during the aperture reducing operation, from an output voltage $V_{(BV'+SV)}$ of the amplifier 6 and issues a voltage $V_\alpha - V_{\Delta AVact}$ at its output terminal O. The voltage $V_\alpha - V_{\Delta AVact}$ is fed through the variable resistor 14 to the inverting input terminal of the amplifier 15. The amplifier 15, into the non-inverting input terminal of which the reference voltage $V_\alpha$ is fed, issues a voltage $V_\alpha + (R/R_\gamma)V_{\Delta AVact}$ at its output terminal, where $R_\gamma$ is the resistance of the variable resistor 14 and R is the resistance of the resistor 16. Choosing the ratio between $R_\gamma$ and R as $R/R_\gamma = 1/\gamma$, the voltage $V_\alpha + (R/R_\gamma)V_{\Delta AVact}$ is equal to $$V_{(\alpha + \frac{1}{\gamma} \Delta AVact)}$$

corresponding to the signal $\alpha + (1/\gamma)\Delta AV_{act}$. The voltage $$V_{(\alpha + \frac{1}{\gamma} \Delta AVact)}$$

is fed to the non-inverting input terminal of the amplifier 12 to compare with an output voltage $V_{(BV'+SV)}$ of the amplifier 6 therein.

Figure 3:
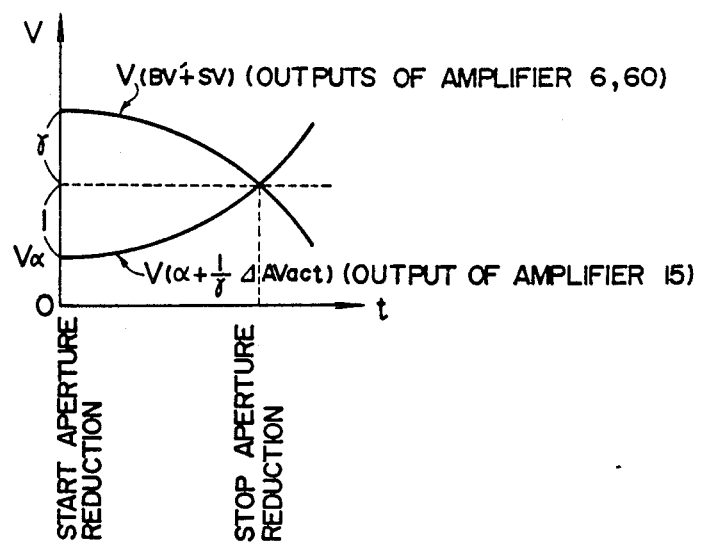
FIG. 3 is a diagram of a variation in output voltage for a diaphragm control in the diaphragm controller shown in FIG. 2.

Hereupon, the output voltage $V_{(BV'+SV)}$ of the amplifier 6 decreases with the lapse of time t as shown in FIG. 3 and the output voltage $$V_{(\alpha + \frac{1}{\gamma} \Delta AVact)}$$

of the amplifier 15 increases with the lapse of time t since it is obtained by inverting the output of the amplifier 6 and applying an operation of it. Specifically, when an object being photographed is bright to some degree, as shown in FIG. 3, the relation $$V_{(BV'+SV)} > V_{(\alpha + \frac{1}{\gamma} \Delta AVact)}$$

holds under the condition where the diaphragm 2 is at open aperture. When the power is applied depressing a release button, an output of the comparator 12 attains the "L" level and the magnet coil 18 is energized to initiate reduction in the diaphragm aperture 2. As the output voltage $V_{BV'}$ of the amplifier 4 decreases with the diaphragm 2 being reduced, the output voltage $V_{(BV'+SV)}$ of the amplifier 6 also decreases as shown in FIG. 3. However, the output voltage $$V_{(\alpha + \frac{1}{\gamma} \Delta AVact)}$$

of the amplifier 15, which is derived by taking out the voltage $V_{\Delta AVact}$ corresponding to the number of steps $\Delta AV_{act}$ in a reduced aperture during the aperture reducing operation based on an output of the amplifier 6 and by applying an operation thereto with program constants of the limit level $\alpha$ at open aperture and the inclination $\gamma$, increases with the diaphragm 2 being reduced. When $$V_{(BV'+SV)} \leq V_{(\alpha + \frac{1}{\gamma} \Delta AVact)},$$

an output of the comparator 12 turns from the "L" level to the "H" level and the magnet coil 18 is deenergized to stop the aperture reducing operation of the diaphragm 2. When $$V_{(BV'+SV)} = V_{(\alpha + \frac{1}{\gamma} \Delta AVact)},$$

that is, $$BV' + SV = \alpha + \frac{1}{\gamma} \Delta AV_{act},$$

a diaphragm control is performed with an aperture AV on the programmed characteristic line $P_0$ shown in FIG. 1 corresponding to the brightness value of the object being photographed. In this connection, in FIG. 3, the time when both outputs of the amplifiers 6 and 15 coincide and the aperture reducing operation is terminated, is the one when variations in both outputs thereof after the initiation of the aperture reducing operation are 1:$\gamma$.

Figure 4:
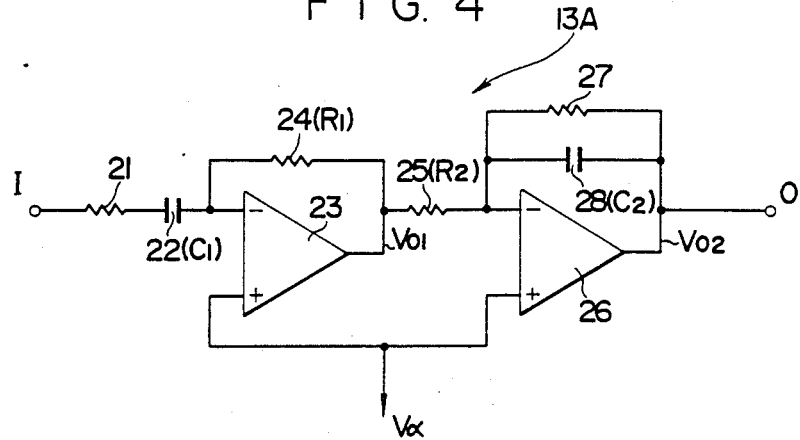
FIGS. 4 to 6 are circuit diagrams showing respective examples of practical circuit constructions of an aperture reduction voltage generating circuit in the diaphragm controller shown in FIG. 2.
Figure 5:
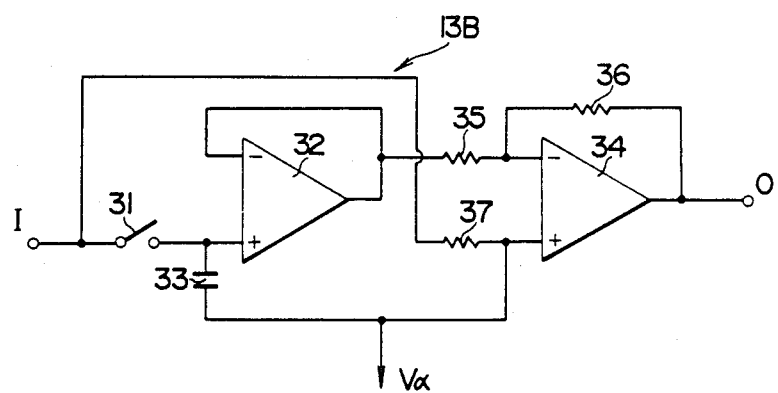
Figure 6:
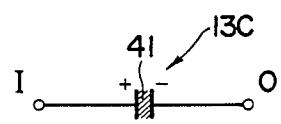

FIGS. 4 to 6 illustrate examples of respective practical circuits of the aperture reduction voltage generating circuit 13. In the circuit 13A shown in FIG. 4, an input terminal I which is connected to the output terminal of the amplifier 6 is connected through a combination of a resistor 21 and a capacitor 22 in series relationship to an inverting input terminal of an operational amplifier 23 which is connected through a resistor 24 to an output terminal thereof. Accordingly, the capacitor 22, resistor 24 and amplifier 23 form a differentiating circuit. In addition, the output terminal of the amplifier 23 is connected through a resistor 25 to an inverting input terminal of the amplifier 26 which is connected through a parallel circuit including a resistor 27 and a capacitor 28 to an output terminal thereof. Accordingly, the resistor 25, capacitor 28 and amplifier 26 form an integration circuit. The output terminal of the amplifier 26 is an output terminal O which is connected to the variable resistor 14 for adjusting the inclination γ. The non-inverting input terminals of the amplifiers 23, 26 are connected to the sliding terminal of the variable resistor 17 so as to receive the reference voltage $V_\alpha$.

In the circuit 13A, when an output voltage $V_{(BV+SV)}$ of the amplifier 6 is fed into the input terminal I, first, the voltage $V_{(BV+SV)}$ is differentiated in the amplifier 23 circuit. Specifically, assuming that the capacity of the capacitor 22 is $C_1$ and the resistance of the resistor 24 is $R_1$, an output voltage $V_{01}$ of the amplifier 23 is expressed as follows.

$$V_{01} = V_\alpha - C_1 R_1 (d/dt)(V_{BV+SV}) \quad (13)$$

The voltage $V_{01}$ is fed into the amplifier 26 to integrate it in the latter. Assuming that the resistance of the resistor 25 is $R_2$ and the capacity of the capacitor 28 is $C_2$, an output voltage $V_{02}$ of the amplifier 26 is expressed as follows.

$$V_{02} = V_\alpha + \frac{C_1 R_1}{C_2 R_2} \int \frac{d}{dt}(V_{BV+SV})dt \quad (14)$$

Here, $(d/dt)(V_{BV+SV})$ in the equation (13) is nothing but the speed of the aperture reducing operation. Accordingly, $\int (d/dt)(V_{BV+SV})dt$ in the equation (14), which means to integrate the aperture reducing speed, corresponds to the number of steps $\Delta AV_{act}$ in an aperture during the aperture reducing operation. In this case, since $\int d/dt(V_{BV+SV})dt$ assumes a negative voltage in the circuit, it follows that $$\int (d/dt)(V_{BV+SV})dt = -V_{\Delta AVact} \quad (15)$$

As a result, when $C_1R_1 = C_2R_2$ the equation (14) is reduced as follows.

$$V_{02} = V_\alpha - V_{\Delta AVact} \quad (16)$$

In an aperture reduction voltage generating circuit 13B shown in FIG. 5, an input terminal I is connected through a switch 31 cooperating with the aperture reducing operation which switch turns from on to off at the time the aperture reducing operation is initiated to a non-inverting input terminal of an operational amplifier 32 which is connected through a storage capacitor 33 to a non-inverting input terminal of an operational amplifier 34 in the next stage and the sliding terminal of the variable resistor 17 which feeds the reference voltage $V_\alpha$. An inverting input terminal of the amplifier 32 is connected to its output terminal which is connected through a resistor 35 to an inverting input terminal of the operational amplifier 34. The inverting input terminal of the amplifier 34 is connected through a resistor 36 to an output terminal O of the amplifier 34 and the non-inverting input terminal of the amplifier 34 is connected through a resistor 37 to the input terminal I.

In the circuit 13B, the switch 31 is closed before the initiation of the aperture reducing operation of the diaphragm 2 and therefore the output voltage $V_{BV+SV}$ of the amplifier 6 is fed through the switch 31 to the non-inverting input terminal of the amplifier 32 and through the resistor 37 to the non-inverting input terminal of the amplifier 34. A voltage which is an inverted one of the non-inverting input terminal voltage of the amplifier 32 is inverted is fed through a resistor 35 into an inverting input terminal of the amplifier 34. Turning the switch 31 to off when the aperture reducing operation is initiated, the output voltage $V_{BV+SV}$ immediately before the initiation of the aperture reducing operation is stored in the capacitor 33 and a voltage $-V_{BV+SV}$ which is an inverted one of the stored voltage is issued as an output voltage of the amplifier 32. As the aperture reducing operation goes on, a voltage at the input terminal I during the aperture reducing operation reaches $V_{BV+SV} - V_{\Delta AVact}$. Hence, assuming that all the resistors 35 to 37 have the same resistance, a voltage $(V_\alpha + V_{BV+SV} - V_{\Delta AVact}) - V_{BV+SV} = V_\alpha - V_{\Delta AVact}$ is issued from the output terminal of the amplifier 34.

An aperture reduction voltage generating circuit 13C shown in FIG. 6 comprises a capacitor 41. Specifically, one end of the capacitor 41 is an input terminal I which is connected to the output terminal of the amplifier 6 and the other end thereof is an output terminal O which is connected to the variable resistor 14 for adjusting the inclination γ. In this case, the capacitor 41 is not directly connected to the variable resistor 17 for the reference voltage $V_\alpha$. However, charge proportional to a difference voltage $(V_{BV+SV} - V_\alpha)$ between the output voltage $V_{BV+SV}$ of the amplifier 6 and the voltage $V_\alpha$ at the non-inverting input terminal of the amplifier 15 is always charged across the capacitor 41 through resistors 14, 16 which are connected to the amplifier 15. Accordingly, assuming now that a voltage at the input terminal I decreases by $V_{\Delta AVact}$ with the diaphragm 2 reduced and the time constant for the combination of the capacitor 41, variable resistor 14 and resister 16 is much larger than the aperture reducing period, a voltage at the output terminal O decreases by $V_{\Delta AVact}$ in the same manner. As a result, a voltage at the output terminal O attains to $V_\alpha - V_{\Delta AVact}$.

Figure 7:
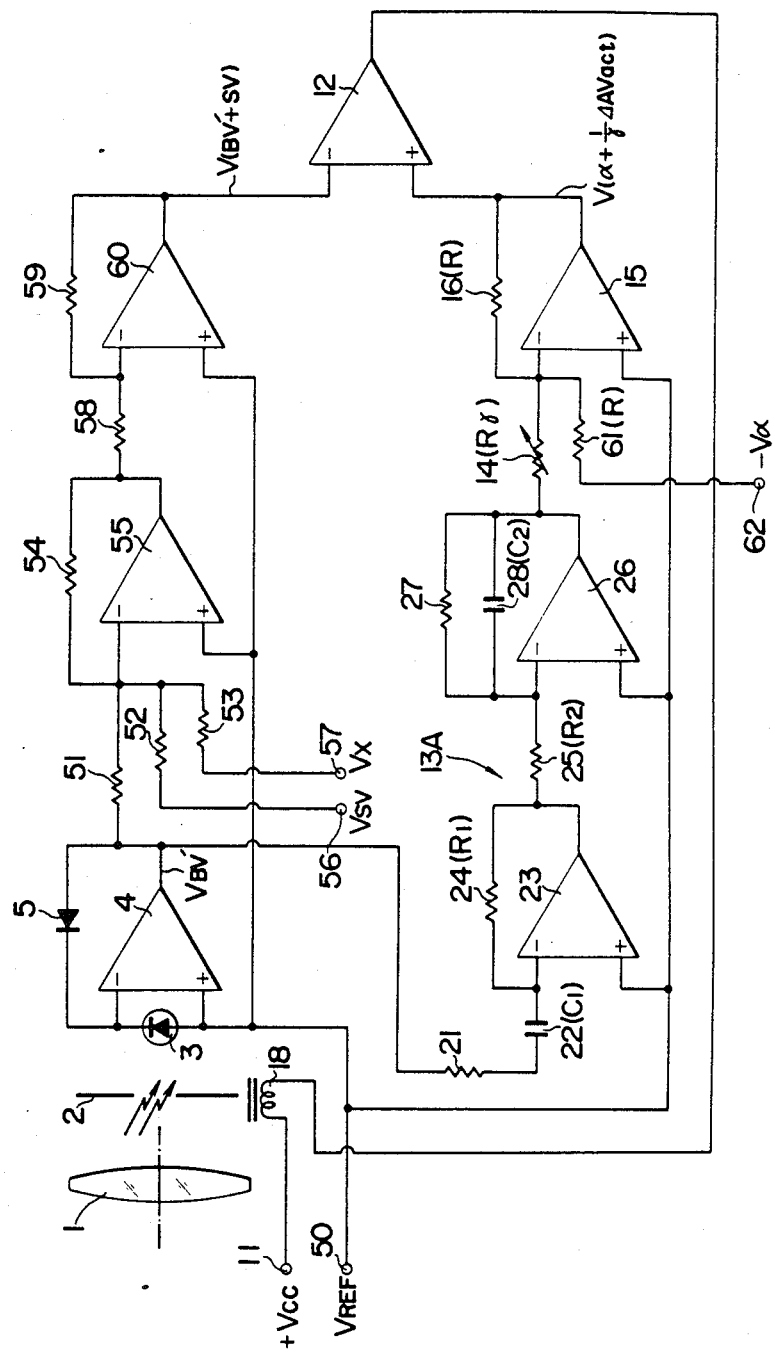
FIG. 7 is a circuit diagram of a diaphragm controller for a camera of the program type illustrating another embodiment of the invention.

In a diaphragm controller of a second embodiment of the invention shown in FIG. 7, a circuit of an operational amplifier 55 for an information adder and a circuit of an operational amplifier 60 for inversion and amplification are provided between the output terminal of the amplifier 4 and the inverting input terminal of the comparator 12 and an output of the amplifier 4 is directly fed to the aperture reduction voltage generating circuit 13A shown in FIG. 4. The points that the diaphragm controller of the second embodiment differs from that of the aforesaid first embodiment will be described as follows. The output terminal of the amplifier 4 is connected through a resistor 51 to an inverting input terminal of the amplifier 55 and to one end of a resistor 21 which is an input terminal of the circuit 13A. The inverting input terminal of the amplifier 55 is connected through resistors 52, 53 to a terminal 56 to which a voltage $V_{SV}$ proportional to the film sensitivity SV is applied and another terminal 57 to which a correction signal $V_x$ which will be described later is applied, respectively. In addition, the inverting input terminal of the amplifier 55 is connected through a resistor 54 to the output terminal thereof which is connected through a resistor 58 to an inverting input terminal of the amplifier 60. The inverting input terminal of the amplifier 60 is connected through a resistor 59 to the output terminal thereof which is connected to the inverting input terminal of the comparator 12. All of the non-inverting input terminals of the amplifier 4, 55, 60 are connected to a terminal 50 to which the reference voltage $V_{REF}$ is applied. The non-inverting input terminals of the amplifiers 23, 26 in the circuit 13A and of the amplifier 15 for calculating the program constant are also connected to the terminal 50 to which the reference voltage $V_{REF}$ is applied. To determine the limit level $\alpha$ with the amplifier 15, the inverting input terminal of the amplifier 15 is connected through a resistor 61 to a terminal 62 to which the reference voltage $-V_\alpha$ is applied.

In the diaphragm controller of the second embodiment, an output voltage of the amplifier 4 is a voltage $V_{BV'}$ proportional to BV' shown in the equation (8) in the same manner as in the first embodiment shown in FIG. 2. The voltage $V_{BV'}$ is fed through the resistor 51 to the amplifier 55. The output voltage of the amplifier 55 is correctly $V_{REF} + V_{BV'}$ but as each amplifier in the diaphragm controller is based on the $V_{REF}$, the description will be made for convenience' sake omitting the term of the reference voltage $V_{REF}$. In the circuit of the amplifier 55 as an adder, assuming that all of the resistances of resistors 51 to 54 are equal, all information fed through resistors 51 to 53 ($V_{BV'}$, $V_{SV}$, Vx) are added together as they are. Now, under the conditions where the open F value is not introduced, since a correctional signal Vx which will be described later is not applied to the terminal 57, a voltage $-V_{BV'+SV}$ corresponding to BV'+SV is issued as an output voltage of the amplifier 55 adding the voltage $V_{BV'}$ to the voltage $V_{SV}$ corresponding to the film sensitivity SV. The output voltage $-V_{BV'+SV}$ is fed through a resistor 58 to the operational amplifier 60. Assuming that the resistances of both resistors 58, 59 are equal, the output of the amplifier 55 is inverted as it is in the circuit of the amplifier 60. Accordingly, an output voltage of the amplifier 60 is $V_{BV'+SV}$ and is fed to the inverting input terminal of the comparator 12.

Further, when an output voltage $V_{BV'}$ of the amplifier 4 is fed through a resistor 21 to the aperture reduction voltage generating circuit 13A, a voltage $$\frac{C_1 R_1}{C_2 R_2} \int \frac{dV_{BV'}}{dt} dt$$

is issued from an output terminal of the operational amplifier 26 in the circuit 13A. The $\int (dV_{BV'}/dt)dt$ means to integrate an aperture reducing speed and corresponds to the number of steps in a reduced aperture. Hence, it follows that $$\int \frac{dV_{BV'}}{dt} dt = -V_{\Delta A Vact}$$

and the output voltage of the amplifier 26 is $-(C_1 R_1 / C_2 R_2) V_{\Delta A Vact}$. The output of the amplifier 26 is fed through a variable resistor 14 for adjusting the inclination to the operational amplifier 15 and is added therein to the reference voltage $-V_\alpha$ which is fed through a resistor 61 to the amplifier 15. Assuming that the resistance of the resistor 61 is equal to that of the resistor 16 and is R, the output voltage of the amplifier 15 is a voltage $$V_\alpha + \frac{C_1 R_1}{C_2 R_2} \cdot \frac{R}{R_\gamma} V_{\Delta A Vact}$$

adding the output voltage of the amplifier 26 $-V_{\Delta A Vact}$ to the reference voltage $-V_\alpha$ and inverting the added value. Accordingly, assuming $$\frac{C_1 R_1}{C_2 R_2} \cdot \frac{R}{R_\gamma} = \frac{1}{\gamma},$$

the output voltage of the amplifier 15 is a voltage $V_{\alpha + (1/\gamma)\Delta A Vact}$ corresponding to the aforesaid signal $\alpha + (1/\gamma)\Delta A V_{act}$.

As described above, in the diaphragm controller of the second embodiment, in the same manner as in the first embodiment, output voltages of the amplifiers 60, 15 vary as shown in FIG. 3 when an object being photographed is bright and the diaphragm is being reduced. When both output voltages coincide, that is, $V_{BV'+SV} \leq V_{\alpha + (1/\gamma)\Delta A Vact}$, the aperture reducing operation of the diaphragm 2 is stopped. At this time, a diaphragm control is conducted in accordance with the programmed characteristic line $P_0$ shown in FIG. 1.

Figure 8:
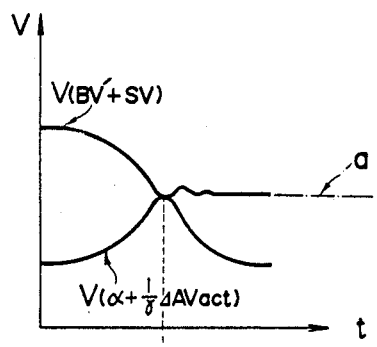
FIGS. 8 to 11 are diagrams of variations in output voltages for an exposure control for the purpose of explaining methods which correct an error during a practical diaphragm control in the diaphragm controllers shown in FIGS. 3 and 7.
Figure 9:
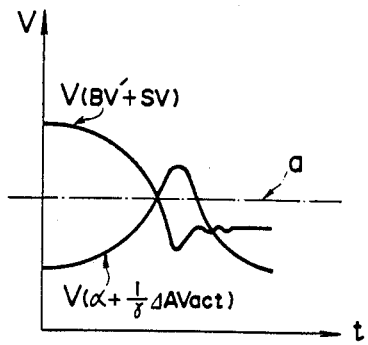
Figure 10:
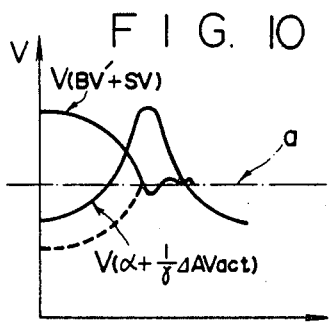
Figure 11:
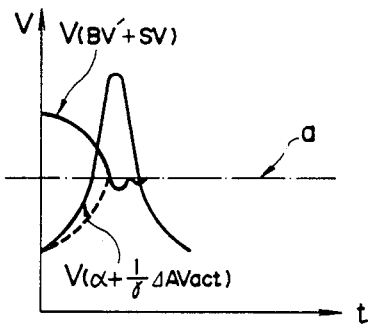

While a diaphragm control is conducted in the diaphragm controller of each of the above mentioned embodiments of the invention in the manner described above, variations in a voltage at the inverting input terminal of the comparator 12, that is, the output voltage $V_{BV'+SV}$ of the amplifiers 6, 60 and a voltage at the non-inverting input terminal of the comparator 12, that is, the output voltage $V_{\alpha + (1/\gamma)\Delta A Vact}$ of the amplifier 15 are ideal when they are as shown in FIG. 8. In this case, when both output voltages coincide and the aperture reducing operation is certainly stopped, the voltage $V_{BV'+SV}$ is maintained at a predetermined limit level a. However, since there exist practically the delay in cut off of a magnet for controlling the diaphragm, or play in a diaphragm lever or a diaphragm ring, the aperture reducing operation may not be stopped at once even when both input terminal voltages of the comparator 12 coincide, as shown in FIG. 9. Accordingly, the aperture reducing operation is further conducted to the condition where the voltage $V_{BV'+SV}$ is below the predetermined level a. In such case, it may be possible to correct it by raising the limit level $\alpha$ or adjusting the inclination $\gamma$ in the program constants. When the reference voltage $V_\alpha$ and the limit level $\alpha$ are made large, the voltage $V_{\alpha + (1/\gamma)\Delta A Vact}$, as shown in FIG. 10, varies from a condition shown with a broken line to that shown with a solid line. Thus, the time when both input terminal voltages of the comparator 12 coincide is advanced and the aperture reducing operation may be stopped when the voltage $V_{BV'+SV}$ reaches the predetermined limit level a. In addition, by adjusting the resistance $R_{65}$ of the resistor 14 so as to assume a smaller inclination $\gamma$ the voltage $V_{\alpha + (1/\gamma)\Delta A Vact}$, as shown in FIG. 11, varies from a condition shown with a broken line to that shown with a solid line so that the aperture reducing operation may be certainly stopped at the predetermined limit level a. It is preferred that the above mentioned correction is achieved by changing the inclination $\gamma$ rather than the limit level $\alpha$ for the reason that the programmed characteristic will not be changed too much. Particularly, when the aperture reducing speed increases, a voltage $V_{\Delta A Vact}$ proportional o $\Delta A V_{act}$ and $V_{\alpha + (1/\gamma)\Delta A Vact}$ increase so that the proper correction for the aperture reducing operation adapted to the number of steps in the reduced aperture and the aperture reducing speed may be made only by correcting the inclination $\gamma$. The correction of $\gamma$ may be made by adjusting the resistance of the resistor 14 or by the following method. Specifically, when the aperture reduction voltage generating circuit 13A which comprises the differentiating and the integration circuit is employed as the circuit 13, $$\frac{C_1 R_1}{C_2 R_2} \cdot \frac{R}{R_\gamma} = \frac{1}{\gamma}$$

so that the value $\gamma$ can be corrected by changing the time constants of $C_1 R_1$, $C_2 R_2$.

Figure 12:
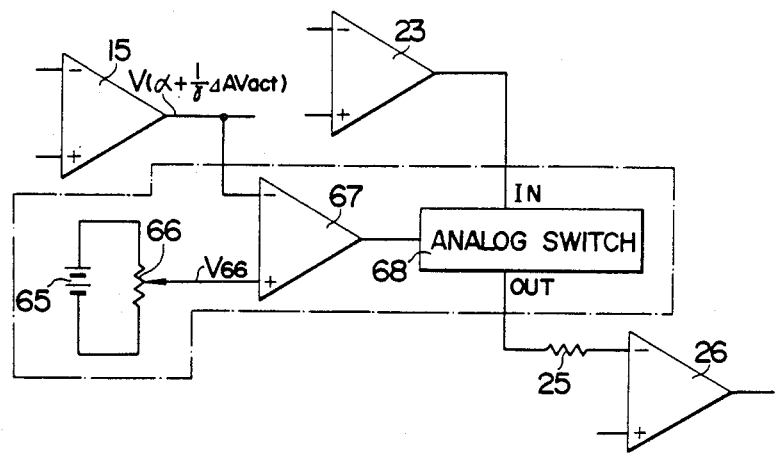
FIG. 12 is a circuit diagram of essential parts illustrating an example of a diaphragm controller for performing a super automatic exposure control.
Figure 13:
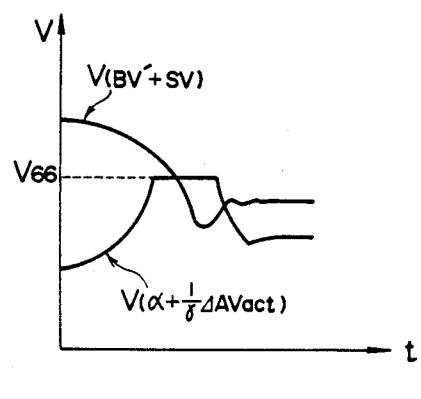
FIG. 13 is a diagram of a variation in output voltage for a diaphragm control in the diaphragm controller shown in FIG. 12.
Figure 14:
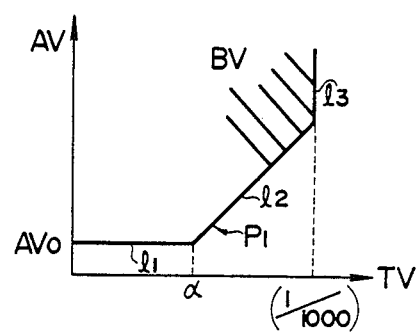
FIG. 14 is a diagram of a programmed characteristic line which is obtained with the diaphragm controller shown in FIG. 12.

When it is desired with the above mentioned diaphragm controller to conduct a diaphragm control in a so-called super automatic exposure control that after being reduced to a predetermined number of steps in an aperture a further aperture reducing operation is conducted by an amount corresponding to the brightness of an object being photographed is conducted, an electric circuit as shown in FIG. 12 may be added to the circuit of the diaphragm controller such as shown in FIG. 7, for example. Specifically, in the circuit shown in FIG. 12, a sliding terminal of a variable resistor 66 for setting a super automatic exposure level which is connected to a power supply 65 is connected to a non-inverting input terminal of a comparator 67 and an inverting input terminal thereof is connected to an output terminal of the amplifier 15. An analog switch 68 is connected between the output terminal of the amplifier 23 in the differentiating circuit and the resistor 25 in the integration circuit. The output terminal of the comparator 67 is connected to a control terminal of the analog switch 68. In the diaphragm controller which conducts the super automatic exposure control, while an output voltage $V_{\alpha+(1/\gamma)\Delta A V_{act}}$ of the amplifier 15 is lower than a voltage $V_{66}$ at the non-inverting input terminal of the comparator 67 which voltage is set by the variable resistor 66, an output of the comparator 67 is at the "H" level and hence the analog switch 68 is on so that an aperture is reduced as an output voltage of the amplifier 15 rises. When $V_{\alpha+(1/\gamma)\Delta A V_{act}} \geq V_{66}$, the output of the comparator 67 turns to the "L" level and the analog switch 68 is off. At this time, a differentiated output of the amplifier 23 is disconnected from the amplifier 26 and the output voltage of the amplifier 15 is maintained at a voltage conforming to the voltage $V_{66}$. Accordingly, thereafter, the number of steps in a reduced aperture is affected only by a variation in the output voltage $V_{BV+SV}$ of the amplifier 60. When the voltage $V_{BV+SV}$, as shown in FIG. 13, lowers to the voltage $V_{66}$, the comparator 12 (see FIG. 7) produces the "H" level signal for stopping the aperture reducing operation. The diaphragm control being conducted as such, it is possible to obtain a programmed characteristic line $P_1$ as shown in FIG. 14, which has a line $l_3$ parallel to the AV axis at TV=1/1000 sec, for example. A circuit for effecting the super automatic exposure control other than shown in FIG. 12 may be constructed as follows: For example, in the circuit shown in FIG. 7, it may be obtained by constructing a circuit to interrupt a signal transmission to the integration circuit in the next stage when an output of the amplifier 23 exceeds a certain given value.

Figure 15:
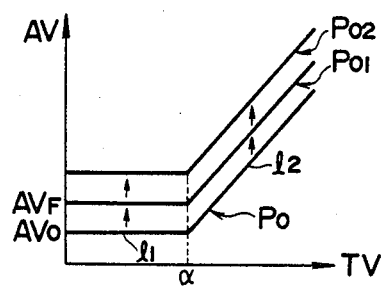
FIG. 15 is a diagram illustrating a variation in programmed characteristic lines with different open F values in the diaphragm controller shown in FIG. 2.

The case where an open F value of a lens $AV_F$ is introduced into the diaphragm controller shown in FIG. 7 will be described. According to the equation (5), when a lens having a larger open F value $AV_F$, which varies depending upon lenses, than the open F value $AV_0$ which is of the basic programmed characteristic on design is employed with the object brightness value BV constant the number of steps in a reduced aperture varies in accordance with the $AV_F$ value and hence the aperture AV also varies. Specifically, when the value $AV_F$ of the lens differs from the value $AV_0$, the programmed characteristic lines $P_0$, as shown in FIG. 15, move in parallel to the straight lines $l_1$ as well as $l_2$ shown in FIG. 1 depending upon the value $AV_F$. As a result, a diaphragm control is conducted to determine an aperture value AV in accordance with the programmed characteristic lines $P_{01}$, $P_{02}$, ... corresponding to respective open F values $AV_F$ of lenses.

When a diaphragm control with such a programmed characteristic as the straight line $l_2$ in the line $P_0$ does not vary even by introducing the open F value $AV_F$ is desired, a correction signal $V_x$ is applied to the terminal 57 in the circuit shown in FIG. 7. Specifically, assuming that a correction value when the value $AV_F$ which varies depending upon a lens in use is introduced is x, the following will be obtained from the equation (5).

$$AV = \frac{\gamma}{\gamma + 1}(BV + SV - \alpha + x - AV_F) + AV_F \quad (17)$$

Equating the equation (17) with the equation (5), it follows that $$\frac{\gamma}{\gamma + 1}(BV + SV - \alpha + x - AV_F) + AV_F = \quad (18)$$

$$\frac{\gamma}{\gamma + 1}(BV + SV - \alpha - AV_0) + AV_0$$

From the equation (18), the following is given.

$$x = (1/\gamma)(AV_0 - AV_F) \quad (19)$$

Figure 16:
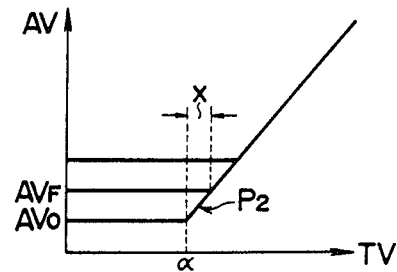
FIG. 16 is a diagram illustrating a variation in programmed characteristic lines when an open F value is introduced into the diaphragm controller shown in FIG. 7.

According to the equation (17) in due consideration of the correction value x indicated by the equation (19), a programmed characteristic line $P_2$ as shown in FIG. 16 will be obtained. When the value $AV_F$ varies, the straight line $l_2$ in the line $P_0$ in FIG. 1 does not vary although a line corresponding to the straight line $l_1$ moves. Accordingly, it is possible to effect a diaphragm control with the programmed characteristic line $P_2$ shown in FIG. 16 by applying a voltage $V_x = V_{(1/\gamma)(AV_0 - AV_F)}$ proportional to the correction x to the terminal 57.

After a diaphragm control has been effected with the diaphragm controller, a movable reflecting mirror is raised and a shutter is opened to expose a film by light from an object being photographed passing through an actual aperture. As a means for determining an exposure period of a film or a shutter speed, for example, a method which effects a TTL direct photometry and closes a shutter when an integrated value based on the TTL direct photometry reaches a value for a shutter speed corresponding to an exposure value on the programmed characteristic line, or a method which stores a required period for reducing an aperture in the diaphragm control and determines a shutter speed corresponding to the required period, or the like method may be used.

As described above, according to the invention, since the diaphragm control is effected in accordance with the number of steps in a reduced aperture by deciding a photometric output of light passing through an aperture during an aperture reducing operation based on an output which is obtained by applying a calculation to outputs which varies in response to the aperture reducing operation so as to satisfy a predetermined program characteristic, there is no need to calculate the brightness of an object being photographed at open aperture as in the past and it is possible to apply a diaphragm control based on a predetermined programmed characteristic even to a camera which has no transmitting member for introducing an open F value.

What is claimed is:

1. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking leans and the diaphragm for producing an output corresponding to a photoelectric variation of said transducer element as the diaphragm aperture is reduced;

a reduced number of steps of diaphragm detecting means responsive to the photometry circuit output for generating a signal proporational to a reduced number of steps of diaphragm while the diaphragm aperture is reduced by said diaphragm driving means based on an output of said photometry circuit, said detecting means producing said signal by inverting the output of said photometry circuit;

a calculation circuit for altering the output of said reduced number of steps of diaphragm detecting means by multiplying said signal by a factor which satisfies a predetermined program characteristic; and a comparison circuit for producing a stop signal to stop an aperture reducing operation of said diaphragm driving means whenever the difference between outputs of said calculation circuit and said photometry circuit reaches a predetermined value.

2. A diaphragm controller according to claim 1, in which the photometry circuit issues an output to which a voltage corresponding to information of a film sensitivity is added and the added output is fed to both the reduced number of steps of diaphragm detecting means and the comparison circuit.

3. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking lens and the diaphragm for producing an output corresponding to a photoelectric variation of said transducer element as the diaphragm aperture is reduced;

a reduced number of steps of diaphragm detecting means responsive to the photometry circuit output for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value; and said photometry circuit issuing an output to which a voltage corresponding to information of a film sensitivity is added and the added output is fed to the comparison circuit and an output of the photometric circuit not including information of a film sensitivity is fed to the reduced number of steps of diaphragm detecting means.

4. A diaphragm controller according to claim 3, in which the photometry circuit issues an output to which a voltage corresponding to a correction due to an open F value of a lens is further added, and an output of the photometry circuit inclusive of information of a film sensitivity and the correction is fed to the comparison circuit and an output of the photometry circuit not including information of a film sensitivity and the correction is fed to the reduced number of steps of diaphragm detecting means.

5. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking lens and the diaphragm for producing an output corresponding to a photoelectric variation of said transducer element as the diaphragm aperture is reduced;

a reduced number of steps of diaphragm detecting means responsive to the photometry circuit otuput for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value;

said reduced number of steps of diaphragm detecting means comprising means for differentiating an output voltage of the photometry circuit and means for determining the reduced number of steps of diaphragm by integrating an aperture reducing speed which is obtained as an output of the differentiating means.

6. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking lens and the diaphragm for reducing an output corresponding to a photoelectric variation of said transducer element as the diaphragm aperture is reduced;

a reduced number of steps of diaphragm detecting means responsive to the photometry circuit output for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value; and said reduced number of steps of diaphragm detecting means comprising a switch cooperating with the initiation of the aperture reducing operation, a capacitor for storing an outut voltage of the photometric circuit immediately before the initiation of the aperture reducing operation in response to the closure of the switch and means for substracting a voltage stored across the capacitor from the output voltage of the photometry circuit.

7. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking lens and the diaphragm for producing an output corresponding to a photoelectric variation of said transducer element as the diaphragm aperture is reduced;

a reduced number of steps of diaphragm detecting means responsive to the photometry circuit output for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value; and said reduced number of steps of diaphragm detecting means including a capacitor for developing a charge proportional to a difference voltage between an output voltage of the photometry circuit and an input voltage of the calculation circuit.

8. A diaphragm controller of a camera of the program type, comprsing:

diaphragm driving means for gradually reducing a diaphragm from its maximum to its minimum aperture;

a photometry circuit including a photoelectric transducer element which receives light from an object being photographed passing through a taking lens and the diaphragm for producing an output corresponding to a photoelectric variation of said transducer element as the diaphragm aperture is reduced;

a reduced number of steps of diaphragm detecting means responsive to the photometry circuit output for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value; and said calculation circuit including means for producing an inclination of a programmed characteristic to an output of the reduced number of steps of diaphragm detecting means through an amplifier circuit having a predetermined amplification factor and subtracting the output of the reduced number of steps of diaphragm detecting means from a voltage proportional to a limit level for an open aperture.

9. A diaphragm controller according to claim 8, in which the time when the aperture reducing operation is stopped is advanced by an operational delay of the diaphragm driving means by adjusting the inclination or the limit level for an open aperture of the programmed characteristic.

10. A diaphragm controller of a camera of the program type, comprising:

diaphragm driving means for gradually reducing a diaphragm from its maximum to its minimum aperture;

a photometry circuit including a photoelectric transducer element which receives light from an object being photographed passing through a taking lens and the diaphragm for producing an output corresponding to a photoelectric variation of said transducer element as the diaphragm aperture is reduced;

a reduced number of steps of diaphragm detecting means responsive to the photometry circuit output for generating a signal proportional to a reduced number of steps while the diaphragm aperture is reduced by said diaphragm driving means based on an output of said photometry circuit;

a calculation circuit for altering the output of said reduced number of steps detecting means so as to satisfy a predetermined program characteristic;

a comparison circuit for producing a stop signal to stop an aperture reducing operation of said diaphragm driving means whenever the difference between outputs of said calculation circuit and said photometry circuit reaches a predetermined value; and said reduced number of steps of diaphragm detecting means and the calculation circuit including means for interrupting a signal transmitting circuit of the reduced number of steps of diaphragm detecting means by detecting an output of the calculation circuit when it reaches a predetermined voltage as an aperture varies with the aperture reducing operation.

11. A diaphragm controller according to claim 10, in which the means for interrupting a signal transmitting circuit of the reduced number of steps of diaphragm detecting means comprises switch means interposed between a differentiating and an integrating means both of which form the reduced number of steps of diaphragm detecting means and comparison means for controlling said switch means by a comparison output between an output voltage of the calculation circuit and a given voltage.

12. A method for adjusting the diaphragm of a camera of the programmed type having a diaphragm capable of being gradually reducing from its maximum to its minimum aperture, a photometry circuit including a photoelectric transducer element which receives light from the object being photographed passing through the taking lens and diaphragm for producing an output corresponding to a photoelectric variation of said transducer element as the diaphragm aperture is reduced, said method comprising the steps of:
  reducing the diaphragm aperture from its maximum toward its minimum aperture;
  obtaining the photometric output;
  determining the number of steps in a reduced aperture based upon the photometric output by inverting the photometric output;
  altering the reduced number of steps value by multiplying the inverted photometric output by a value which is in accordance with a program characteristic;
  adding the aforesaid altered value to a predetermined value representing the maximum aperture;
  comparing said sum with the photometric output value; and
  halting the diaphragm driving means when the compared values are in coincidence.

13. A diaphragm controller of a camera of the program type, comprising:
  diaphragm driving means for gradually reducing a diaphragm from its maximum to its minimum aperture;
  a photometry circuit including a photoelectric transducer element which receives light from an object being photographed passing through a taking lens and the diaphragm for producing an output corresponding to a photoelectric variation of said transducer element as the diaphragm aperture is reduced;
  a reduced number of steps of diaphragm detecting means responsive to the photometry circuit output for generating a signal proportional to a reduced number of steps of diaphragm while the diaphragm aperture is reduced by said diaphragm driving means based on an output of said photometry circuit;
  a first calculation circuit responsive to an output from said detecting means and a characteristic whose value varies with a predetermined program time for calculating a decision value so as to satisfy a given program characteristic;
  a second calculation circuit for producing an output by adding a film sensitivity value to the output of said photometry circuit, and
  a comparison circuit for producing a stop signal to stop an aperture reducing operation of said diaphragm driving means whenever the difference between the output of said first calculation circuit and the output of said second calculation circuit reaches a predetermined value.

14. A diaphragm controller according to claim 13 wherein the signal proportional to a reduced number of steps of diaphragm is represented by the value $\Delta AVact$; wherein the output of said photometry circuit is represented by the value $^VBV^1$; wherein said characteristic is represented by the value $(\alpha,\gamma)$: wherein said decision value is represented by $$V\left(\alpha + \frac{1}{\gamma} AVact\right) ;$$

wherein the output of said second calculation circuit is represented by the value $V(BV1+SV)$; wherein $\Delta AVact$ represents the number of steps an aperture value is reduced from the open aperture during the aperture reducing operation; wherein $^VBV^1$ is a voltage whose value represents the Brightness Value; and wherein the values of $(\alpha,\gamma)$ and $A$ are constants.

* * * * *

UNITED STATES PATENT AND TRADEMARK OFFICE
CERTIFICATE OF CORRECTION

PATENT NO. : 4,693,584

DATED : September 15, 1987

INVENTOR(S) : Tetsuo Miyasaka

It is certified that error appears in the above-identified patent and that said Letters Patent is hereby corrected as shown below:

IN THE TITLE PAGE

Column 1, change the Assignee from "Olymputs Optical Co., Ltd," to --Olympus Optical Co., Ltd,--.

IN THE SPECIFICATION

Column 4, line 28, change "operation" to --operational--.

Column 8, line 30, change "resister" to --resistor--.

Column 9, line 19, change "conditions" to --condition--.
             line 20, change "correctional" to --correction--.

Column 10, line 49, change "$R_{65}$" to --$R_\gamma$--

UNITED STATES PATENT AND TRADEMARK OFFICE
CERTIFICATE OF CORRECTION

PATENT NO. : 4,693,584
DATED : September 15, 1987
INVENTOR(S) : Tetsuo Miyasaka

It is certified that error appears in the above-identified patent and that said Letters Patent is hereby corrected as shown below:

IN THE CLAIMS

Column 13, Claim 1, line 14, change "leans" to --lens--.
                   line 21, change "proporational" to --proportional--.

Column 15, Claim 6, line 15, change "outut" to --output--.

Column 15, Claim 8, line 54, change "comprsing" to --comprising--.

Signed and Sealed this

Twenty-sixth Day of January, 1988

Attest:

DONALD J. QUIGG

*Attesting Officer*  *Commissioner of Patents and Trademarks*